United States Patent [19]
Johnston

[11] Patent Number: 5,046,054
[45] Date of Patent: Sep. 3, 1991

[54] APPARATUS FOR DISTRIBUTING LUBRICANT TO AIR GUNS IN A SINGLE AIRLINE AIR GUN SUBARRAY

[76] Inventor: Otis A. Johnston, 203 Rampart Ct., League City, Tex. 77573

[21] Appl. No.: 538,387

[22] Filed: Jun. 14, 1990

[51] Int. Cl.⁵ .......................... G01V 1/04; G01V 1/38
[52] U.S. Cl. .................................. 367/144; 181/120; 92/154; 137/237
[58] Field of Search ....................... 181/115, 118, 120; 367/144, 146; 92/154; 137/237

[56] References Cited
U.S. PATENT DOCUMENTS 3,604,534  9/1971  Whitaker ............................... 92/154
4,324,311  4/1982  Farris ................................... 181/120

Primary Examiner—Brian S. Steinberger

[57] ABSTRACT

The invention is an apparatus for distributing a lubricant to the air guns in a single airline seismic air gun subarray which utilizes an air-lubricant mixture to operate and lubricate the air guns in the subarray. The air-lubricant mixture from the single airline is supplied to each air gun through a separate adapter and a cut-off valve. The lubricant tends to accumulate near the first several air guns, which wind up using most of the lubricant contained in the mixture while leaving no or very little lubricant for the remaining air guns. To prevent this uneven distribution of the lubricant, a lubricant metering device is placed in certain adapters to control the amount of the lubricant supplied to their associated air guns. Using the lubricant metering device to control the lubricant supply to the air guns in a subarray ensures that all the air guns receive adequate lubricant supply.

1 Claim, 3 Drawing Sheets

APPARATUS FOR DISTRIBUTING LUBRICANT TO AIR GUNS IN A SINGLE AIRLINE AIR GUN SUBARRAY

BACKGROUND OF THE INVENTION

1. Field of the Invention

This invention relates to air gun subarrays used in marine seismic surveying, and more specifically to an apparatus for distributing a lubricant to air guns in a single airline air gun subarray.

2. Discussion of the Prior Art

In marine seismic surveying, air gun arrays or subarrays are frequently used as acoustic transmitters. Several subarrays are pulled simultaneously by a vessel at a predetermined depth below the water surface in a body of water, usually the sea. One type of subarray contains several spaced-apart air gun stations connected in series, each station containing at least one air gun. To operate the air guns, air at high pressure, which can easily exceed 1500 psi, is supplied to all air guns from a single airline. To increase the working life of each air gun and to reduce regular maintenance, it is necessary to supply adequate amount of a lubricant to each air gun in the subarray during operation. One method which has been utilized to supply a lubricant to the air guns is to supply an air-lubricant mixture to the single airline. A problem exists with respect to the proper distribution of the lubricant to the air guns. The lubricant, being the heavier component of the air-lubricant mixture, drops out and is utilized at the first several air gun stations, leaving very little or no lubricant for the back air gun stations. This can significantly reduce the working life of the air guns and also require frequent servicing and maintenance of the air guns in the back stations which are cost prohibitive for each air gun costs several thousand dollars to manufacture and the maintenance is labor intensive.

The present invention provides an apparatus for use with an air gun in the single airline subarray to supply only a certain amount of lubricant to that gun, thereby permitting the remaining lubricant in the air-lubricant mixture to go to the subsequent guns.

SUMMARY OF THE INVENTION

The invention is directed to an apparatus for controlling the lubricant flow into an air gun of a single airline air gun subarray which utilizes an air-lubricant mixture to operate and lubricate a plurality of air guns. An adapter having a partially threaded through cavity is sealingly attached around an opening in the airline. A lubricant metering device having an externally threaded cylindrical member that is adapted to mate with the threaded portion of the adapter cavity and a tube through its longitudinal axis is screwed into the adapter so that one end of the tube protrudes above the inside surface of the airline. A small hole in the tube is provided to controllably transfer the lubricant from the adapter cavity to the air gun.

These and other features and advantages of the present invention will become apparent with reference to the following detailed description of the preferred embodiment thereof in connection with the accompanying drawings wherein like reference numerals have been applied to like elements, in which:

DESCRIPTION OF THE PREFERRED EMBODIMENT

Figure 1:
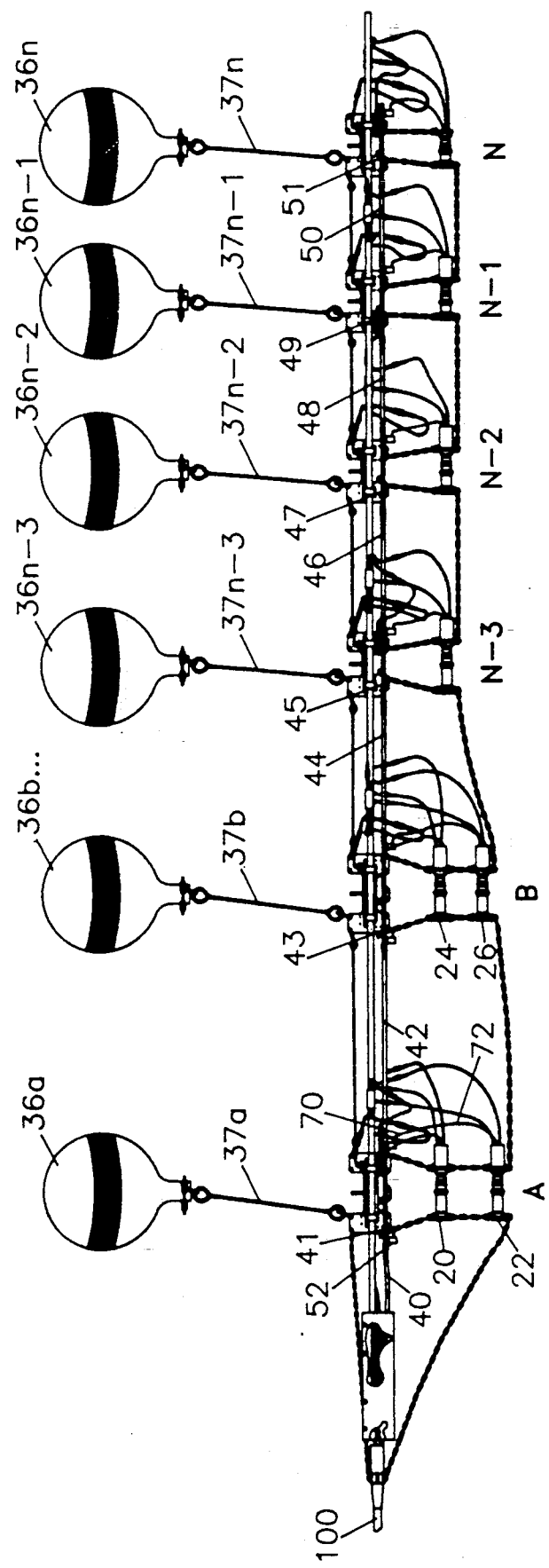
FIG. 1 shows a single airline air gun subarray having multiple air gun stations.

FIG. 1 shows a single airline air gun subarray 10 having multiple spaced-apart air gun stations A–N. The first two air gun stations A and B each contain two air guns while the remaining air gun stations each contain one air gun. A single airline which is made up of several serially-connected sections 40-51 is connected to each air gun in the subarray via a separate adapter and cut-off valve arrangement and an air hose. The single airline is used to supply an air-lubricant mixture to each air gun in the subarray 10. Synthetic oils, mineral oils or anti-freeze materials such as glycol-based fluids may be used as lubricants. Anti-freeze materials are preferred in colder environments, such as Alaska region, because these materials provide anti-freeze protection and lubrication for the air guns. It should be noted that the term lubricant herein is used in the generic sense to include oils, anti-freeze materials and other fluids which can be used to enhance the operation of the air guns. For example, the air-lubricant mixture to the gun 22 is supplied from section 41 of the airline through a cut-off valve 53 and via a hose 72. During marine seismic surveying, the subarray 10 is towed by a vessel. The buoyancy bubbles 36 a–n keep the subarray afloat at a depth below the water surface which is determined by the length of the links 37 a–n. A predetermined air and lubricant mixture is supplied to the single airline through the front end 100. Air guns are discharged every few seconds to produce acoustic signals to do seismic surveying. Although FIG. 1 is shown as a particular subarray configuration, it should be obvious that it is possible to make many configurations containing different number of stations, air guns and the spacing therebetween. The present invention applies equally to any such configurations. The particular configuration of FIG. 1 is shown only by way of an example.

Figure 2:
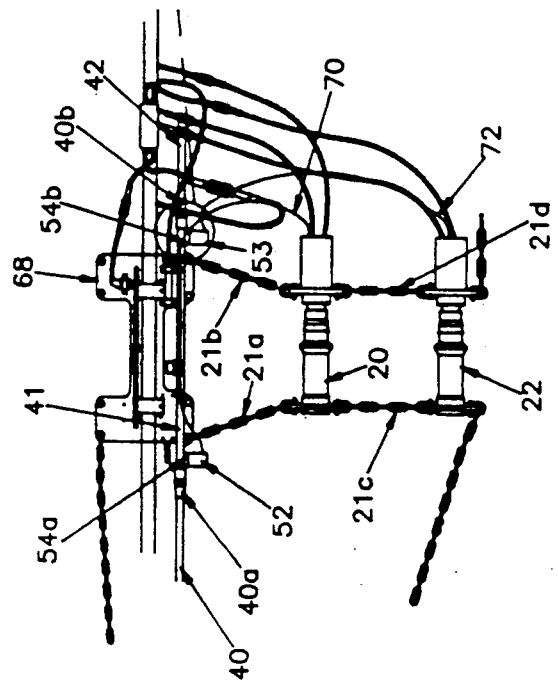
FIG. 2 shows an enlarged simplified view of a portion of the first air gun station of the air gun subarray of FIG. 1.

FIG. 2 shows an enlarged but slightly simplified version of the first air gun section to more clearly describe the present invention. As noted earlier, high pressure air-lubricant mixture is supplied to the hose 40 which is sealingly connected to an airfitting 40a. A metal pipe 41 is connected to the airfitting 40a on one end and an airfitting 40b on the other end. The air fitting 40b is connected to a rubber hose 42, which carries the air-lubricant mixture to the next air gun station. The pipe 41 is fixedly attached to a clamp 68, which among other things, provides the necessary mechanical support for the air guns 20 and 22 and certain other hardware which is used in the air gun subarray.

An adapter 54a is sealingly connected around an opening to the pipe 41 to provide an air path or passageway from the pipe 41 to the air gun 20. The adapter 54a is made to mate with a cut-off valve 52, which is provided in the air path for safety reasons. A hose 70 is connected to the cut-off valve at one end and the air gun 20 at the other end to supply the air-lubricant mixture from the pipe 41 to the air gun 20. Similarly, an adapter, cut-off valve and hose combination is provided for each air gun in the subarray of FIG. 1. As will be obvious, when only one air gun is used in an air gun section, only one adapter cut-off valve arrangement will be needed. Similarly, adapter 54b, cut-off valve 53 and hose 72 are used to supply air-lubricant mixture to the air gun 22.

Figure 3:
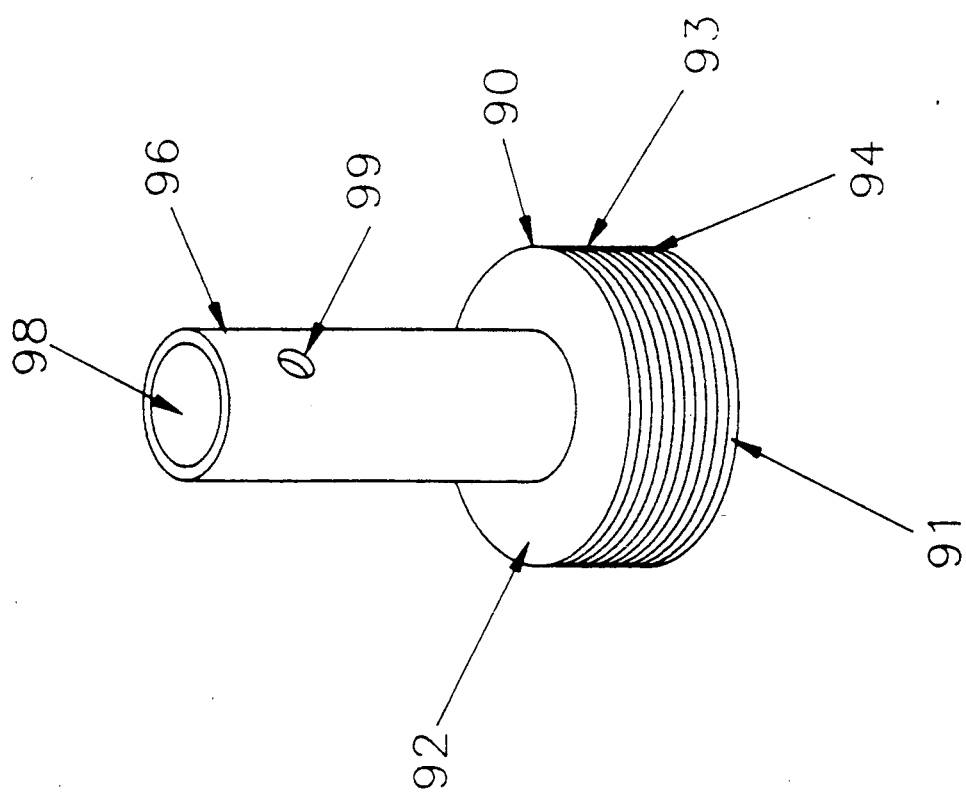
FIG. 3 shows an isometric view of a lubricant metering device.

During operation, an air-lubricant mixture at high pressure is supplied to the common airline. A problem exists in that the lubricant being the heavier component of the air-lubricant mixture drops out around the first several air guns and passes on to those guns. The remaining or back air guns receive very little or no lubricant. To properly distribute the lubricant to each air gun in the subarray, a lubricant metering device 90 of FIG. 3 is used in a selected number of the adapters in the subarray. Usually, the lubricant metering device is used for each air gun except for the last air gun in the subarray. The lubricant metering device 90 permits only a certain amount of lubricant to flow to its associated air gun thereby permitting the remaining lubricant in the air-lubricant mixture to be distributed to other air guns in the subarray. The lubricant metering device 90, as shown in FIG. 3, is a cylindrical member having surfaces 91 and 92 whose cylindrical surface is threaded. A hollow tube or pipe 96 is fitted around or through a through hole in the cylindrical member 93. The pipe 96 extends a certain length beyond the surface 92 of the cylindrical member 90. A small metering hole 99 is provided in the tube 96. The metering device 90, thus, has two through paths, one from the hole 98 and the other from the hole 99 and through the cylindrical member 90. The lubricant to an air gun is metered through the hole 99 and the air through the hole 96.

The use of the metering device 90 in an adapter to permit only a certain amount of the lubricant to flow to its corresponding air gun will now be described by referring to FIG. 4.

Figure 4:
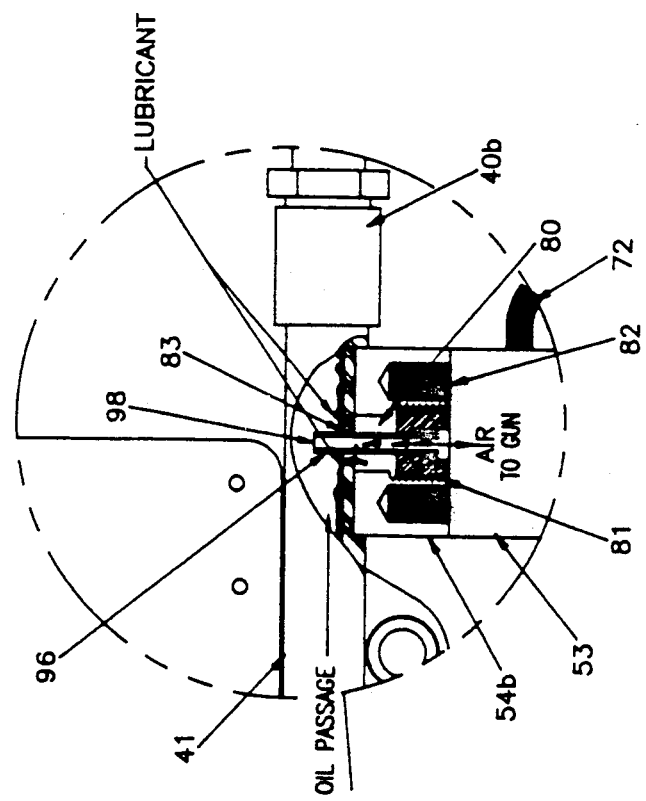
FIG. 4 shows a cross-sectional view of the lubricant metering device of FIG. 3 installed in the airline of the air gun subarray of FIG. 1.

FIG. 4 shows a partial cross-section of the pipe 41 where the adapter 54b is attached. The adapter 54b has a through hole or cavity 81 which is internally threaded up to a predetermined distance from the surface 82. The internal threads 83 in the cavity 81 are adapted to mate with the external threads 94 on the lubricant metering device 90. The lubricant metering device 90 is threaded in the adapter so that the tube 96 extends into the pipe 41 through a hole 80 in the pipe 41. The cut-off valve 53 is sealingly attached to the adapter 54b. A hose 70 is attached to the cut-off valve 55b and the air gun 22 for supplying the air gun with the air-lubricant mixture.

During operation, air-lubricant mixture at high pressure is supplied to the pipe 41. The lubricant being the heavier component of the mixture, drops out and accumulates in the pipe 41 around the tube 96. This oil fills up the cavity 81. Unrestricted air flows from the pipe 41 to the cut-off valve 53 through the tube 96. The lubricant flows from the cavity to the cut-off valve through the metering hole 99 and then to the air gun 22. The amount of the lubricant to the air gun is controlled by the size of the metering device hole 99. Using a metering device for an air gun in a station ensures that it receives only a measured amount of the lubricant while leaving the remaining lubricant in the air-lubricant mixture for lubricating other air-guns in the subarray. The high pressure air carries some of the accumulated lubricant to the next air guns in the subarray. Using a metering device for each of the air guns, except the last one in the subarray, ensures that each air gun receives an adequate supply of the lubricant. When a metering device is not used, all of the accumulated lubricant in the pipe 41 near the adapter 54b would be supplied to the air gun 22. Since lubricant tends to accumulate near the first few guns in a subarray, and when the metering devices are not used, those air guns wind up receiving most of the lubricant from the air-lubricant mixture while the back air guns receive no or an insufficient amount of lubricant.

Although the foregoing description and the accompanying drawings are directed to a particular embodiment of the invention, it will be apparent, however, to those skilled in the art that many modifications and changes to the above described preferred embodiment are possible without departing from the scope and spirit of the invention. It is intended that the following claims be interpreted to embrace all such modifications and changes.

What is claimed is:

1. Apparatus for controlling lubricant flow into an air gun of a single airline subarray which utilizes an air-lubricant mixture, the airline having an opening, comprising:

(a) an adapter having a top and a bottom surface and a through cavity which is partially threaded a certain distance starting from the bottom surface, the adapter sealingly attached to the airline around the opening to form a through passageway from the airline to the bottom surface of the adapter; and (b) a lubricant metering device having a cylindrical member with cylindrical top and bottom surfaces, the cylindrical surfaces being threaded to mate with the threaded cavity of the adapter, the cylindrical member also having a through hole extending from its bottom to the top surface, a through tube having an upper and a lower end connected to the top surface of the cylindrical member at its lower end to provide a through passageway, said tube having a hole near the upper end, said lubricant metering device screwed in the adapter so that the upper end of the tube protrudes inside the airline.

* * * * *